United States Patent
Edwards

(10) Patent No.: US 11,354,638 B2
(45) Date of Patent: Jun. 7, 2022

(54) DYNAMIC SECURITY FOR A SELF-CHECKOUT TERMINAL

(75) Inventor: Thomas V. Edwards, Suwanee, GA (US)

(73) Assignee: NCR Corporation, Atlanta, GA (US)

(*) Notice: Subject to any disclaimer, the term of this patent is extended or adjusted under 35 U.S.C. 154(b) by 285 days.

(21) Appl. No.: 12/972,702

(22) Filed: Dec. 20, 2010

(65) Prior Publication Data

US 2012/0158529 A1 Jun. 21, 2012

(51) Int. Cl.
*G06Q 20/20* (2012.01)
*G07G 3/00* (2006.01)
*G07G 1/00* (2006.01)
*G06Q 20/40* (2012.01)

(52) U.S. Cl.
CPC .......... *G06Q 20/20* (2013.01); *G06Q 20/208* (2013.01); *G06Q 20/405* (2013.01); *G07G 1/0009* (2013.01); *G07G 1/0054* (2013.01); *G07G 3/003* (2013.01)

(58) Field of Classification Search
CPC .............................. G06Q 20/20; G07G 1/0054
See application file for complete search history.

(56) References Cited

U.S. PATENT DOCUMENTS

| | | | | |
|---|---|---|---|---|
| 4,486,625 A | * | 12/1984 | Reinauer | H04M 11/04 379/106.01 |
| 5,557,513 A | * | 9/1996 | Frey | G06Q 10/0631 705/16 |
| 5,877,485 A | * | 3/1999 | Swartz | G06Q 20/208 186/61 |
| 6,047,262 A | * | 4/2000 | Lutz | 705/16 |
| 7,044,370 B2 | * | 5/2006 | Bellis et al. | 235/383 |
| 7,987,105 B2 | * | 7/2011 | McNeill et al. | 705/7.12 |
| 8,061,603 B2 | * | 11/2011 | Connell et al. | 235/383 |
| 2001/0015375 A1 | * | 8/2001 | Swartz | G06Q 30/06 235/383 |
| 2007/0109134 A1 | * | 5/2007 | Dugan | G07C 9/00111 340/573.1 |
| 2007/0194112 A1 | * | 8/2007 | Petroskey | G06Q 20/20 235/383 |
| 2007/0210155 A1 | * | 9/2007 | Swartz et al. | 235/383 |
| 2008/0059972 A1 | * | 3/2008 | Ding | G06F 9/505 718/105 |
| 2008/0147511 A1 | * | 6/2008 | Edwards | 705/18 |

* cited by examiner

*Primary Examiner* — Allen C Chein
(74) *Attorney, Agent, or Firm* — Schwegman, Lundberg & Woessner

(57) ABSTRACT

An item level security system is provided that uses dynamic security settings to optimize the competing requirements for high security and transaction throughput. Customer metrics such as customer traffic volume and the number and type of items purchased change over the course of a day and are further influenced by the day of the week and by holidays and certain vacation schedules for local schools and employers. The invention provides dynamic security settings for the item level security system that address the changing customer metrics.

18 Claims, 4 Drawing Sheets

DYNAMIC SECURITY FOR A SELF-CHECKOUT TERMINAL

FIELD OF THE INVENTION

The present invention relates generally to a self-checkout terminal. More particularly, but not exclusively, the invention relates to an item level security system for a self-checkout terminal.

BACKGROUND

In general, self-checkout terminals implement an item level security system that uses weight to detect when an item presented for purchase has been misidentified. When a misidentification is performed on purpose, the misidentification typically involves a user identifying an item as a less expensive item. However in some cases of item misidentification, the user is not aware that an item presented for purchase is mislabeled.

Unfortunately, item level security can result in reduced transaction throughput at the self-checkout terminal. Additionally, customer satisfaction is reduced because lower transaction throughput leads to increased checkout wait times and because the system will sometimes detect a misidentified item not caused by the customer, which can embarrass the customer. Historically, the settings that control the self-checkout item level security are manually set and tend to be static in nature. That is, they are set when a self-checkout terminal is installed or updated and rarely if ever changed after that.

Thus, a need exists for a self-checkout terminal with an item level security system that uses dynamic item level security settings and that lessen the negative impact to throughput and customer satisfaction during peak business periods while still providing an adequate level of security.

SUMMARY OF THE INVENTION

Among its several aspects, the present invention recognizes competing conditions in an item level security system used in self-checkout terminals and the need to provide a dynamic ability to adjust security settings to optimize the competing conditions.

The invention addresses these problems, as well as others, by recognizing that customer metrics such as customer traffic volume and the number and type of items purchased change over the course of a day and that metrics are further influenced by the day of the week and by holidays and certain vacation schedules for local schools and employers. The invention provides dynamic security settings for the item level security system that address the different customer metrics that occur at different times and dates and the security requirements to prevent or lower fraud.

In one embodiment, the invention provides a computer implemented security method in a self-checkout terminal. The method comprises obtaining the current time and date and determining one or more item level security parameters where the parameters are optimized and intended for use during the obtained time and date. The method further comprises setting one or more item level security settings to the corresponding values of the one or more item level security parameters where the settings determine the level and type of item level security that is currently enforced on the self-checkout terminal.

A more complete understanding of the present invention, as well as further features and advantages of the invention, will be apparent from the following Detailed Description and the accompanying drawings.

DETAILED DESCRIPTION

In the following description, numerous details and embodiments are set forth to provide an understanding of the claimed invention. However, it will be appreciated by those skilled in the art that various modifications to the described embodiments may be made without departing from the spirit and scope of the invention and that numerous variations or modifications from the described embodiments are possible. Throughout this specification, like numbered elements are used to describe the same parts throughout the various drawing figures referred to and described.

Figure 1:
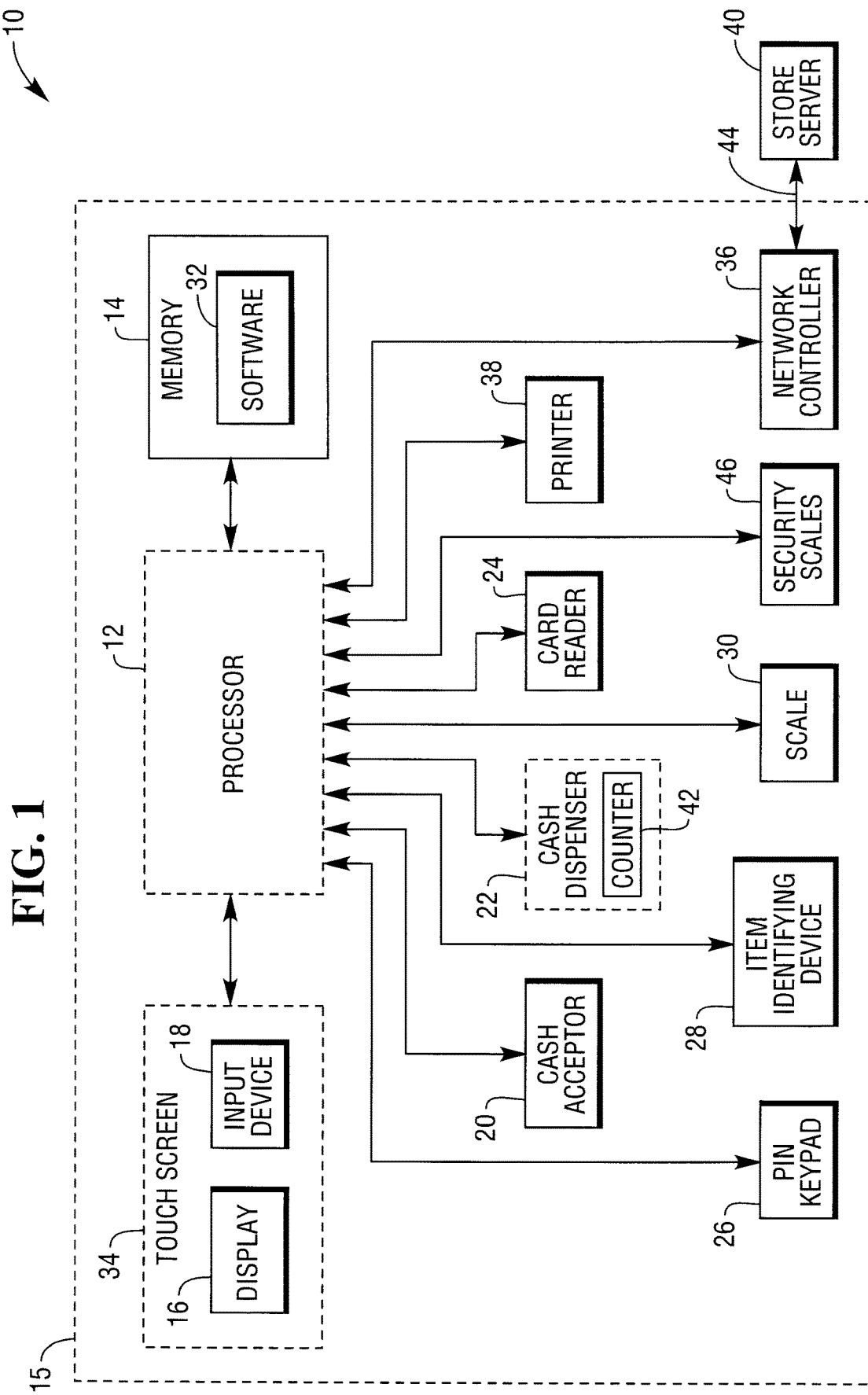
FIG. 1 is a block diagram of an exemplar embodiment of a self-service checkout system.

Referring now to FIG. 1, an exemplar self-checkout system 10 is provided that includes a self-checkout terminal 15 connected to a store server 40 by a network 44. The self-checkout terminal 15 includes a processor 12, a memory 14, a display 16, an input device 18, a cash acceptor 20, a cash dispenser 22, a card reader 24, a personal identification number (PIN) keypad 26, an item identifying device 28, a weigh scale 30, security scales 46, a network controller 36 and a printer 38.

The processor 12 executes software 32 that controls the operation of the self-checkout terminal 15. The software 32 is stored in the memory 14, which is accessed by the processor 12. Data, including settings used by the software 32, is also stored in the memory 14 either as part of the software 32 or separate from the software.

One of the functions of software 32 is to provide item level security for items presented to the checkout terminal 15 for purchase. The item level security uses an items actual and expected weight to determine if an item has been properly identified.

The cash dispenser 22 dispenses cash to customers, usually in the form of change or additional cash back. The cash dispenser 22 may include a coin dispenser and a bill dispenser, which may be separate devices.

In an alternative embodiment, the cash dispenser 22 includes a coin counter 42. An employee feeds or pours bills and coins into the cash dispenser 22 and the counter 42 counts the bills and coins added and provides the software 32 with numbers and amounts of received bills and coins.

The display 16 displays instructions and information provided by the software 32. For example, the display 16 displays information about items presented for purchase as part of a purchase transaction, a total price for the purchase transaction and payment options including cash and non-cash payment options. Non-cash payment options include, but are not limited to, credit, debit, smart card, gift card, stamps, and vouchers. In addition, the display 16 displays information when an error or problem is detected during the scanning and identification of an item presented for purchase.

The input device 18 records operator inputs processed by the software 32. The input device 18 may include a keyboard. The input device 18 and the display 16 may be combined into a touch screen 34.

The cash acceptor 20 accepts cash payments from customers. The cash acceptor 20 may include a coin acceptor and a bill acceptor, which may be separate devices.

The card reader 24 reads information from cards, such as credit and debit cards. The card reader 24 may include a magnetic strip reader.

The PIN keypad 26 records customer PINs during debit card transactions or when a security code is required from the customer.

The item identifying device 28 records information from products. The item identifying device 28 may include a barcode reader or a radio frequency label identification reader. The barcode reader may include a laser scanner or an image based scanner or a combination of both.

The weigh scale 30 records weights of certain items, such as produce items that are sold by weight.

The printer 38 prints transaction documents, including receipts.

The network controller 36 connects the self-checkout terminal 15 to the network 44 and support communications with other computers connected to the network 44 including the store server 40.

The self-checkout terminal 15 additionally includes security systems, which may include one or more security scales 46.

The security scales 46 determine whether unidentified products have been substituted for identified products, usually of lesser value. The security scales 46 may be located under set-aside shelves and bagging area shelves. As an item is identified by the item identifying device 28, the item is placed in either on the set-aside shelf or in a bag on the bagging area shelve. The security scales 46 then detect the change in weight and report the new weight to the software 32. The software 32 then determines the actual weight of the item by calculating the change in weight reported by the security scales 46 after the item was added.

In some embodiments, the function of the weigh scale 30 and the security scale 46 are combined into a single weigh scale The store server 40 includes one or more databases. The databases contain information on items available for purchase. When appropriate the information includes an expected weight for the item. Not all items have an expected weight. Some produce and meat items are sold by weight and do not have an expected weight. However, they may have a range of acceptable weights that is used by security software to determine is a measured weight is in a proper range. The databases also include security parameters that are used by the self-checkout terminal 15 to determine the type and level of security that should be implemented by the terminal 15 for any giving time and date.

Figure 2:
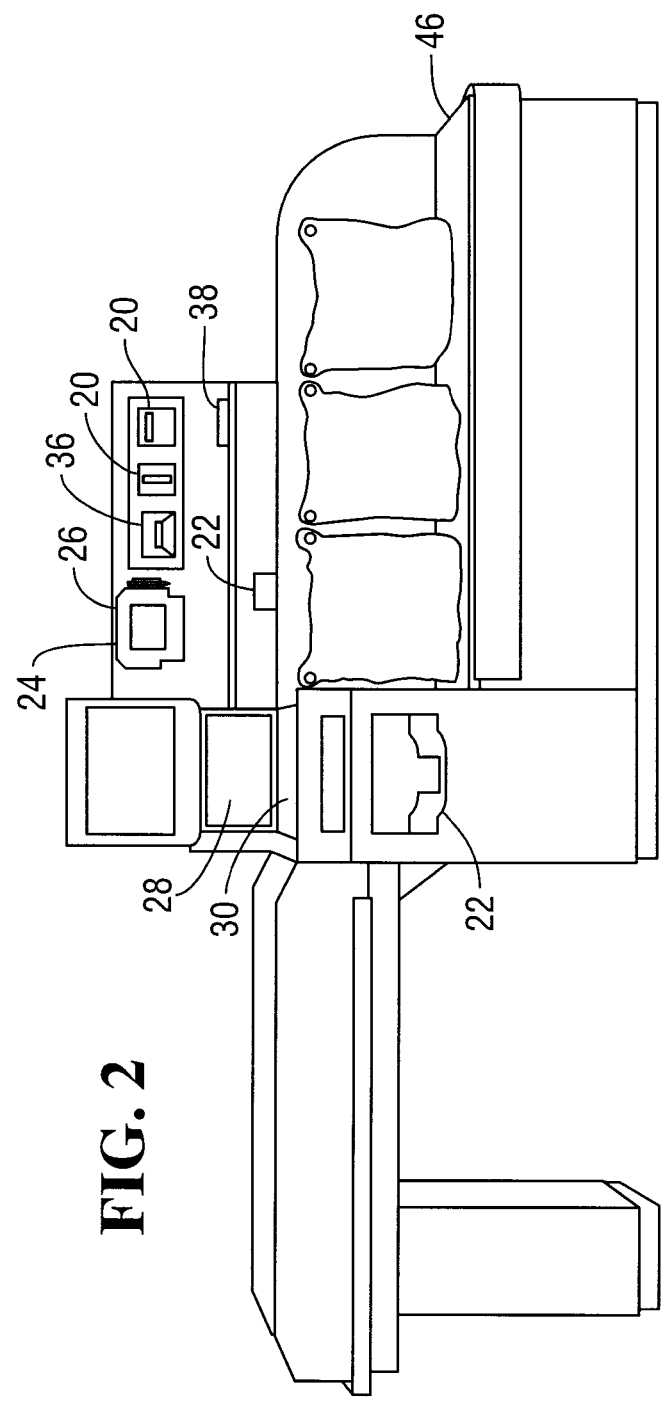
FIG. 2 is a view illustrating an exemplar embodiment of a self-service checkout terminal.

With reference to FIG. 2, an exemplar embodiment of the self-checkout terminal 15 is illustrated. The elements depicted in the illustration are the same as described in FIG. 1.

The self-checkout terminal 15 includes item level security features that are implemented by the software 32. Included in these features is the ability to monitor each item presented to the terminal 15 for identification and purchase to determine if the identified item is the actually item presented.

Customers can, either unknowingly or knowingly, present an item for purchase that is improperly labeled. In some cases, the item was improperly labeled when the customer selected it for purchase and the customer has no knowledge of the problem. In other cases, the customer has tampered with the label or scans one item but placed another more expensive item in a bag on the security scales 46. Either case will lead to an incorrect price being charge for an item.

The item level security software is designed to detect items that are mislabeled or not properly scanned. To accomplish this, an item database is maintained that contains the expected weight of items that have a stable and determinable weight. For example, a five pound bag of sugar will weigh approximately five pounds. Process variations and leakage from the package will cause the actual weight to vary. However, the software 32 tries to account for normal variations so as not to falsely report that the item has been mislabeled or tampered with. False reporting is a problem and can be caused by a mislabeled item, unusual variations in product weight or local issues. Some local issues include a child of the customer that touches the security scales 46 or put things on the scales 46 during the transaction. Either will cause false reporting.

Continuing with the sugar example, when the five pound bag of sugar is presented to the terminal 15, the item identifying device 28 identifies the item. Using the item's identity, the software 32 queries the item database to obtain an expected weight value and other information for the item. Some of the information is displayed on the display 16 and the item is placed on the security scales 46. The security scales 46 reports the new total weight to the software 32, which using the previous and new total weights calculate the actual weight of the item placed on the scales 46. The software 32 then uses the expected and actual weight to determine if the item was properly identified or if the item was misidentified.

When a misidentified item is detected either correctly or falsely, the software 32 will notify an attendant of the problem and stop further operations at the checkout terminal 15 until the attendant addresses the problem and notifies the terminal 15 to continue. This increases the time required for the purchase transaction and reduces the throughput of the terminal 15 (sometimes measured as transactions per hour).

The item level security software uses several methods to either prevent or mitigate the effects of falsely detecting a misidentified item. One method is to create allowable item tolerance parameter for each item. This parameter is stored in the item database with the expected weight for each item. The allowable item tolerance parameter can be different for each item. For example, the tolerance parameter for the five pound bag of sugar would be different from the tolerance parameter for a can of corn. The weight for the canned corn, being more stable over a population of cans, has a smaller tolerance value than bags of sugar which will leak sugar as they are manufactured, transported and stocked on the store shelves. The item tolerance parameter can be a percentage of the expected weight. For example, the item tolerance parameter for the five pound bag of sugar is 5 percent of the expected file pounds. Therefore, the acceptable weight range for a five pound bag of sugar is five pounds plus or minus 5 percent of five pounds.

The item tolerance parameter is set for each item. However, at certain times, it is advantageous to increase or decrease the item tolerance parameter for all items. A global item tolerance parameter (GITP) is used for this purpose. The global item tolerance parameter is used to modify each individual item tolerance parameter before it is used to determine the range of acceptable weights for an item. For example, if the GITP is set to 2, the value of each individual item tolerance parameter is doubled before use. If the GITP is set to 3, the value of each individual item tolerance parameter is multiplied by 3. If the GITP is set to 0.5, the value of each individual item tolerance parameter is multiplied by 0.5. This example is provided to show one possible method of using the global item tolerance parameter but not necessarily the only method.

Another security method uses an exception forgiveness parameter. The exception forgiveness parameter instructs the item level security software 32 to forgive or not report a certain number of misidentified items that are detected during each purchase transaction. For example, if the exception forgiveness parameter is set to one, the item level security software 32 will accept for purchase the first detected misidentified item and will only report subsequent misidentified items. Normally, this parameter is set to zero but during high customer traffic periods it can be set higher to optimize utilization of the terminal 15. This parameter is stored in a database but as a global parameter and not as data for each item like the item tolerance parameter. Other similar strategies of forgiveness are possible for example, reporting the first misidentification then beginning the forgiveness to make it less likely that the shopper will be able to identify that their transaction is receiving favorable treatment and therefore encourage correct shopper behavior.

The above methods provide ways to either prevent or mitigate the effects of falsely detecting a misidentified item. However, reducing false misidentifications also lowers the level of item security, which increases the risk of product shrinkage experienced by a store using the terminal 15. This risk is acceptable during certain times to keep the terminal 15 throughput as high as possible and thus reduce checkout times for customers. But lower levels of item security should be limited to times high customer traffic.

To accomplish this, the store server 40 has an item security database that includes global item level security parameters such as the global item tolerance parameter and exception forgiveness parameter. The item security database is organized to have multiple sets of global item level security parameters and each set of parameters is optimized for and associated with a specific time period. The time period is defined by the day of the week and a period of time during each day. For example, a time period could be defined to be from 6 AM to 11 AM on a Monday. In this case, the database would include a value for each of the global item level security parameters that valid and optimized for that time period (6 AM to 11 AM on Monday). There are no restrictions on the length in hours or days that a time period can cover.

The security system allows each store to customize the item level security parameters based on their own historical customer traffic data and to create as many time periods as required. For example, during times of historically high customer traffic, the security parameters are set to reduce security and thus increase the transaction rate and improve throughput. During times of historically low customer traffic, the security parameters are set to normal or increased security and thus decrease the transaction rate.

The item level security software uses the date to determine the day of the week. The software also allows special events such as holidays and school vacations and special sales to be entered with parameters that override the normal parameters for that day of the week and time. For example, if the local schools have a holiday on Monday, Mar. 5, 2010, the normal time periods for a Monday and the associated security parameter values would be overridden by the time periods and security parameter values defined for Mar. 5, 2010. However, the following Monday would use the normal periods and security values assuming there was no special event on that day. A school vacation might necessitate a change in security parameter values because of the increased possibility that the customer would have children with them and they could cause false item identification.

In some embodiment, the item level security software 32 will further optimize the global item level security parameters retrieved from the item security database based on the current level of terminal utilization and customer traffic. The software 32 will determine dynamic customer traffic data and terminal utilization and then further optimize the global item level security parameters. For example, the item level security software 32 retrieves global item level security parameters in effect for the current time and day of week but if the dynamic customer traffic data is below a certain threshold, the software 32 will adjust the values for the security parameters to increase security. However, if the dynamic customer traffic data is above the threshold it will use the retrieved values.

By way of example, the current customer traffic load on the terminal 15 can be represented by a weighted average of the time between the previous N transactions; allowing for the normal time for one shopper to clear their purchased items from the bagging area before the next customer can begin their transaction. This is represented as:

$$\text{Load}=((T_1-T_c)*W_1+(T_2-T_c)*W_2+ \ldots +(T_n-T_c)*W_n)/n$$

where $T_1$, $T_2$, and $T_n$ represent a time measured between the end of one customer purchase transaction and the start of the next transaction on one checkout lane; $T_c$ is a constant time representing the expected time for a customer to remove their items from the bagscale after the completion of a transaction until the next transaction is started; $W_n$ is a weighting designed to emphasize more recent terminal activity over older transactions. When transaction times are measured and aggregated as described above across the store, then the computed load value is indicative of a store's current customer traffic and can be used to optimize the security settings effected in that store, at that time.

In some embodiments, the item level security software 32 will randomly adjust the security parameters to prevent customers from being able to predict when item level security has been lowered. The software 32 will randomly adjust item level security from a lower setting to higher setting and then randomly adjust it back to the lower setting. This prevents a customer from predicting what the item level security settings are just by detecting a high level of customer traffic. This feature is implemented during periods where the item level security has been lowered or when dynamic customer traffic is high. The random nature of the security may be based either on the item or transaction probability; and may be combined with other algorithms such as described previously to adjust the random nature of the security rules based on time and day. For example, security rules might be configured to not check 30% of the items sold during busy period, but not check 10% of items during less busy periods. Likewise, the rules might be configured to apply to complete transactions instead of individual items.

In some embodiments, the item level security software 32 will determine the cost of an item and then increase item level security if the item has a low cost and decrease the item level security if the item has a high cost. The assumption is that a customer would not scan a high cost item and then substitute a low cost item for it. High cost items have a higher probability of being properly identified. However, a low cost item could be scanned and then replaced with a high cost item. Therefore, the security is increased for low cost items.

Figure 3:
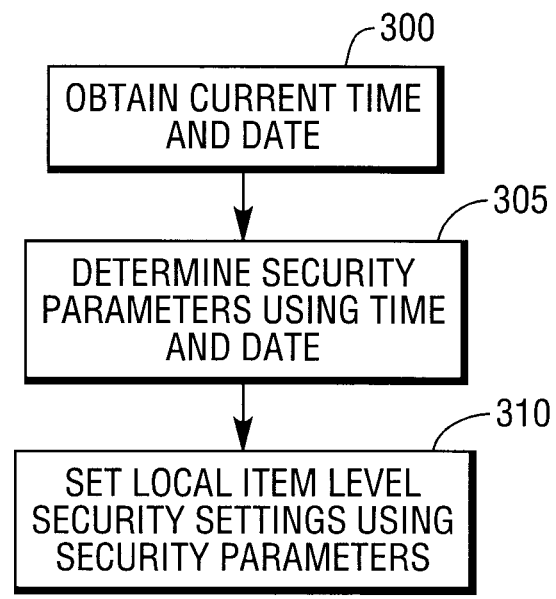
FIG. 3 is a flow diagram illustrating a method of obtaining dynamic item level security parameters in a self-checkout terminal.

With reference to FIG. 3, there is provided a high level flow chart depicting an item level security function. Item level security software 32 executing on the terminal 15 obtains the current time and date (step 300). This information is maintained locally in the terminal 15 but is synchronized with a central clock on periodic basis (e.g., once a day or once a week). The software 32 then determines the global item level security parameters for the obtained current time and date (step 305). The software 32 uses the current time and date as keys to retrieve the global item level security parameters from the item security database. In some embodiments, the software 32 will further optimize the global item level security parameters as described above. In step 310, the software 32 sets the local item level security settings in the terminal 15 using the retrieved or optimized global item level security parameters. The software 32 will perform this function periodically. In some embodiments, the function is performed at the beginning of each purchase transaction.

Figure 4:
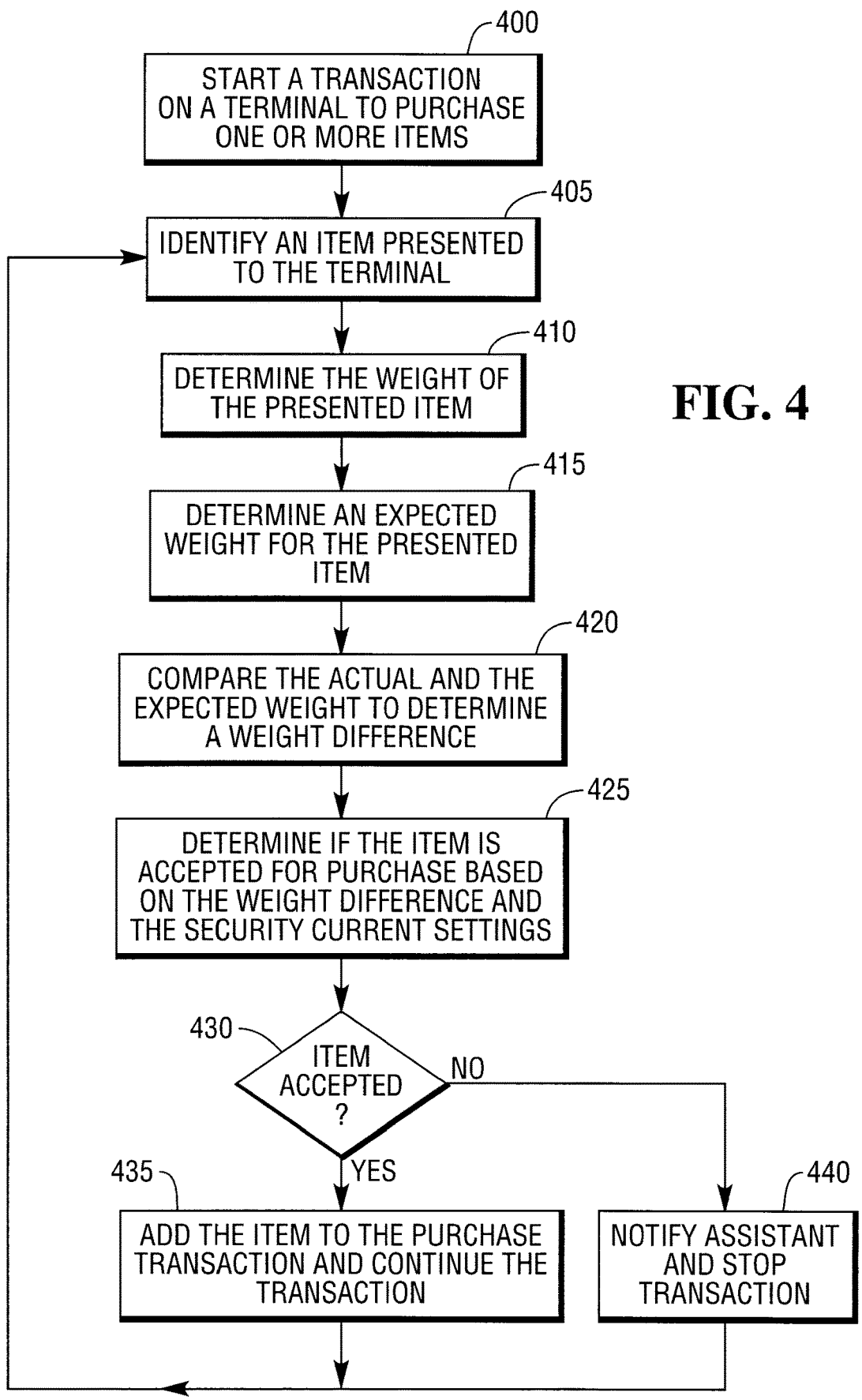
FIG. 4 is a flow diagram illustrating a method of using dynamic item level security settings in a self-checkout terminal.

With reference to FIG. 4, there is provided a high level flow chart depicting another item level security function performed by the software 32 in the terminal 15. In step 400 a purchase transaction is started on the terminal 15. In step 405, an item is presented to the terminal 15 and identified. The item can be identified by scanning a bar code or reading an RFID tag or entering a code on the input device 18. In step 410, the actual weight of the item is determined by using the security scale 46. In step 415, the expected weight of the presented item is determined by using the item identity to look up the item in the item database. The item database returns data that includes the expected weight of the item, the allowable item tolerance parameter for the item, the price and a description. In step 420, the actual weight is compared to the expected weight to determine a weight difference. In step 425, the allowable item tolerance parameter for the item is modified by the global item tolerance settings stored locally and the result is used to determine the maximum allowable deviation from the expected weight. The maximum deviation is compared to the determined weight difference and if the weight difference is less, the item passes and is accepted as a properly identified item. If the weight difference is greater, the item fails and is determined to be misidentified. At this point, the global exception forgiveness parameter is checked. If the value is zero, the item is reported as misidentified. If the value is greater than zero, a local variable, which is reset to the forgiveness value at the beginning of each purchase transaction, is checked to determine if it is zero. If it is greater than zero, the value is decremented by one and the item is reported as properly identified even though it was not.

In step 430, if the item was accepted for purchase, control passes to step 435 where the item is added to the purchase transaction and control passes back to step 405. If the item was determined to be misidentified, control passes to step 440 where a notification is sent to an assistant and all customer operations at the terminal 15 are stopped. Once the assistant has cleared the problem, the transaction continues to step 405.

Although particular reference has been made to weight based item level security for self-checkout applications, the claims are equally applicable to other forms of item or transaction level security that are based on capacitance, texture, color and dimensions. In addition, while a self-checkout terminal is illustrated herein, an assisted checkout terminal would also benefit from the invention because it would reduce employee based fraud and find mislabeled items without embarrassing the customer.

I claim:

1. A method for enforcing security on a self checkout terminal, the method implemented as executable instructions within a non-transitory computer-readable medium and executed by one or more hardware processors of the self checkout terminal, the method comprising:

obtaining, by the instructions executing on the one or more hardware processors of the self checkout terminal, the current time and date;

obtaining, by the instructions, multiple item level security parameters where the parameters are optimized and only valid for use during a specified time period and where the obtained time and date falls within the specified time period, and wherein obtaining further includes modifying each of the multiple item security parameters by a global item tolerance parameter automatically determined based on current terminal utilization at the self checkout terminal;

maintaining, by the instructions, a security exception forgiveness setting as a global parameter, wherein the security exception forgiveness setting comprising a current setting value that is initially set based on a current customer traffic load that is calculated, and wherein the security exception forgiveness setting is not data associated with any particular items, wherein a first misidentification of a first item is reported to the current customer before the security exception forgiveness setting is set and maintained for forgiveness to encourage the current customer to correct behavior of the current customer;

wherein the multiple item level security pa ra meters include a security exception forgiveness setting which is set to the current setting value that instructs the instructions to forgive, ignore, and not report a predetermined number of misidentified items and stop all operations at the self checkout terminal when the predetermined number of the misidentified items are exceeded;

setting, by the instructions, multiple security settings to the corresponding values of the multiple item level security parameters where the security settings determine the level and type of item level security that is currently enforced on the self checkout terminal and at least some of the security settings are dynamically lowered based on the current time and date being the specified time period for enforcing lessened security on the self checkout terminal and thereby increasing customer throughput while operating the self checkout terminal during the specified time period, wherein setting further includes randomly reducing and randomly increasing at least some of the multiple item level security parameters for a period of time and based at least in part on when item level security has been lowered by adjusting item level security higher and then randomly reducing the item level security or when customer traffic is increased by adjusting the item level security higher and then randomly reducing the item level security, wherein randomly reducing and increasing further includes determining a random nature of security based on item probabilities for being misidentified and time and day, and wherein randomly reducing and increasing further includes calculating the current customer traffic load as a weighted average of time between a predefined number of previous transactions at the self checkout terminal, setting the current setting value of the security exception forgiveness setting based on the current customer traffic load that was calculated, and comparing the current customer traffic load against a predefined value to determine whether there is one of:

normal traffic, increased customer traffic, and decreased customer traffic; and decrementing the current setting value of the security exception forgiveness setting each time a particular misidentified item is permitted to pass by ignoring and not reporting the particular misidentified item and without stopping a current transaction and stopping the current transaction and reporting the particular misidentified item when the security exception forgiveness setting is zero.

2. The method of claim 1, wherein the multiple item level security parameters include an allowable item weight tolerance setting.

3. The method of claim 1, wherein the date includes the day of the week and the multiple item level security parameters are optimized for the day of the week using historically store customer traffic data for each day of the week and for periods of time during the day.

4. The method of claim 3, wherein the date includes holidays and school vacations and the multiple item level security parameters are optimized using historic store traffic data for the holidays and school vacations.

5. The method of claim 1, further including determining dynamic customer traffic data for the terminal.

6. The method of claim 5, wherein the multiple item level security parameters are further optimized using the determined dynamic customer traffic data for the terminal.

7. The method of claim 1, wherein the one or more multiple item level security parameters are further optimized by increasing item level security parameters for low cost items and decreasing item level security parameters for high cost items.

8. The method of claim 1, wherein obtaining the multiple item level security parameters includes retrieving the parameters from a database using the obtained current time and date as part of a database query command to identify and retrieve only those parameters valid for the current time and date.

9. The method of claim 1, further including:
identifying an item presented to the terminal for purchase;
determining the actually weight for the item;
determining an expected weight for the item;
comparing the actually and expected weight of the item to determine a weight difference for the item; and
determining based on the weight difference and multiple item level security settings if the item is accepted for purchase.

10. A self checkout terminal for performing a purchase transaction with enforced security, the terminal comprising:
an item scanner adapted to identify an item presented to the terminal for purchase as part of the purchase transaction;
a weigh scale adapted to determine the weight of the item presented to the terminal;
a hardware processor in communication with the item scanner and the weigh scale where the processor executes instructions from memory and the instructions when executed cause the processor to:
obtain the current time and date;
obtain multiple item level security parameters where the parameters are optimized and only valid for use during a specified time period and where the obtained time and date falls within the specified time period, and wherein obtaining further includes modifying each of the multiple item security parameters by a global item tolerance parameter automatically determined based on current terminal utilization at the self checkout terminal;
set multiple security settings to the corresponding values of the multiple item level security parameters where the security settings determine the level and type of item level security that is currently enforced on the self checkout terminal and wherein the multiple item level security parameters include the security exception forgiveness setting that is set to forgive a predetermined number of misidentified items by ignoring and not reporting the predetermined number of the misidentified items;
identify an item presented to the terminal for purchase using the item scanner;
determine the actually weight for the item using the weigh scale;
determine an expected weight for the item;
compare the actually and expected weight of the item to determine a weight difference for the item;
maintain the security exception forgiveness setting as a global parameter, wherein the security exception forgiveness setting comprises a current setting value that is initially set based on a current customer traffic load that is calculated, and wherein the security exception forgiveness setting is not data associated with any particular items, wherein a first misidentification of a first item is reported to the current customer before the security exception forgiveness setting is set and maintained for forgiveness to encourage the current customer to correct behavior of the current customer;
determine based on the weight difference and the multiple item level security settings if the item is accepted for purchase as part of the purchase transaction, and determine based upon the current setting value of the security exception forgiveness setting whether to accept the item when the item is misidentified when the predetermined number of the misidentified items are not exceeded and stopping all operations at the self checkout terminal when the item that is misidentified is not accepted, and dynamically decrease at least one security setting based on the specified time period and thereby increasing customer throughput while operating the self checkout terminal, and randomly reduce and randomly increase at least some of the multiple item level security parameters for a period of time and based at least in part on when item level security has been lowered by adjusting item level security higher and then randomly reducing the item level security or when customer traffic is increased by adjusting the item level security higher and then randomly reducing the item level security, wherein randomly reducing and increasing further includes determining a random nature of security based on item probabilities for being misidentified and time and day, and wherein randomly reducing and increasing further includes calculating the current customer traffic load based as a weighted average of time between a predefined number of previous transactions at the self checkout terminal, setting the current setting value based on the current customer traffic load that was calculated, and comparing the current customer traffic load against a predefined value to determine whether there is one of:

normal traffic, increased customer traffic, and decreased customer traffic; and decrement the current setting value of security exception forgiveness setting each time a particular misidentified item is permitted to pass without stopping the purchase transaction and stopping the purchase transaction when the security exception forgiveness setting is zero.

11. The terminal of claim 10, wherein the multiple item level security parameters include an allowable item weight tolerance setting.

12. The terminal of claim 10, wherein the date includes the day of the week and the multiple item level security parameters are optimized for the day of the week using historic store customer traffic data for each day of the week and for periods of time during the day.

13. The terminal of claim 12, wherein the date includes holidays and school vacations and the multiple item level security parameters are optimized using historic store traffic data for the holidays and school vacations.

14. The terminal of claim 10, further including determining dynamic customer traffic data for the terminal.

15. The terminal of claim 14, wherein the multiple item level security parameters are further optimized using the determined dynamic customer traffic data for the terminal.

16. The terminal of claim 10, wherein the multiple item level security parameters are further optimized by increasing item level security parameters for low cost items and decreasing item level security parameters for high cost items.

17. The terminal of claim 10, wherein obtaining the multiple item level security parameters includes retrieving the parameters from a database using the obtained current time and date as part of a database query command to identify and retrieve only those parameters valid for the current time and date.

18. The terminal of claim 17, wherein the database is located on a server in communication with the self checkout terminal.

* * * * *